June 16, 1936.  J. VAN NIEUWLAND  2,044,031
TURNTABLE
Filed April 16, 1934  3 Sheets-Sheet 1

Witness:
Geo L. Chapel

Inventor
John Van Nieuwland

By Rice and Rice
Attorneys

June 16, 1936. J. VAN NIEUWLAND 2,044,031
TURNTABLE
Filed April 16, 1934 3 Sheets-Sheet 2
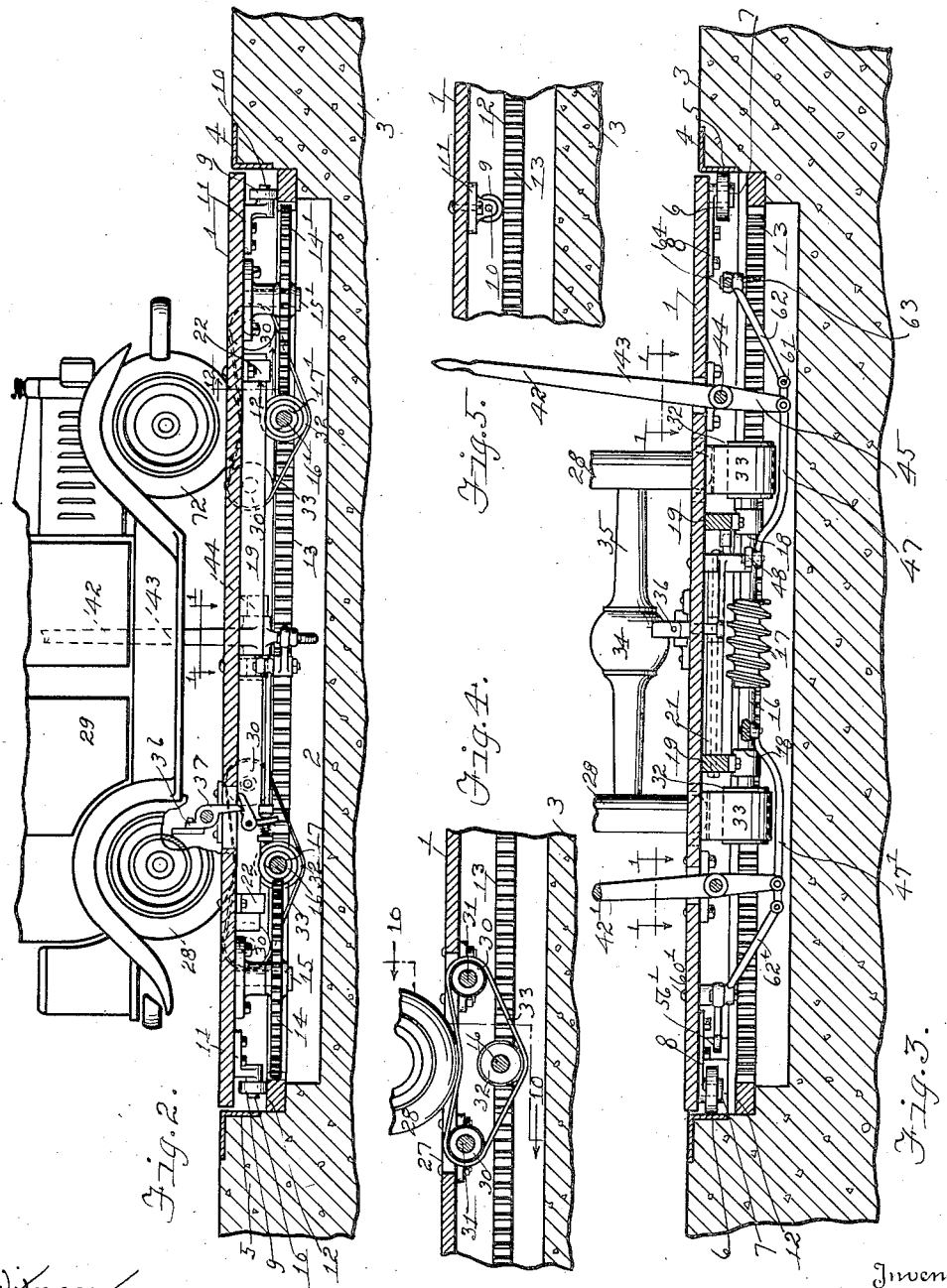
Witness:
Geo L. Chakel
Inventor
John Van Nieuwland
By Rice and Rice
Attorneys

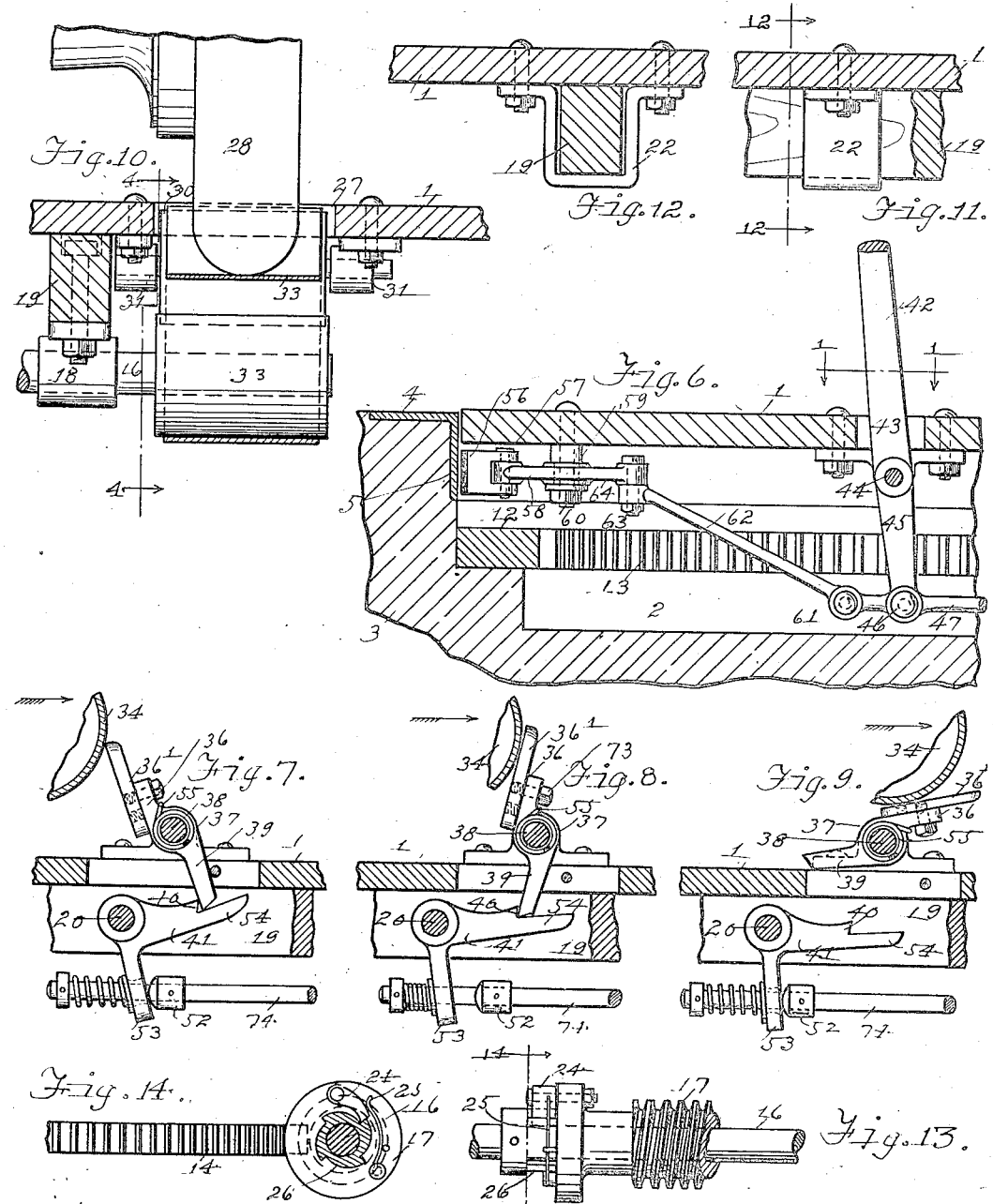

Patented June 16, 1936

2,044,031

UNITED STATES PATENT OFFICE 2,044,031

TURNTABLE

John Van Nieuwland, Holland, Mich.

Application April 16, 1934, Serial No. 720,797

14 Claims. (Cl. 104—44)

The present invention relates to turntables for automobiles and the like; and its object is, generally, to provide such a turntable improved in various respects hereinafter appearing; and more particularly, to provide such a turntable rotatable by operating the automobile's motor; and further, to provide improved means for rotating the turntable by said motor; and further, to provide releasable means for holding the automobile against movement on the turntable; and further, to provide improved means for holding the turntable against rotation; and further, to provide improved means for operating the turntable to turn an automobile driven thereon from opposite sides; and further, to provide said parts and such means in combinations.

These and any other and more specific objects hereinafter appearing are attained by, and the invention finds preferable embodiment in, the turntable particularly described in the body of this specification and illustrated by the accompanying drawings in which:

Figure 2 is a central vertical sectional view thereof taken on line 2—2 of Figure 1 and showing the automobile thereon;

Figure 3 is a central vertical sectional view of the same taken on line 3—3 of Figure 1;

Figure 4 is a vertical sectional view of certain parts taken on line 4—4 of Figures 1 and 10;

Figure 5 is a vertical sectional view of parts taken on line 5—5 of Figure 1;

Figure 6 is a vertical sectional view of parts taken on line 6—6 of Figure 1;

Figures 7, 8 and 9 are sectional views of parts taken on a vertical plane corresponding to line 2—2 of Figure 1 and showing said parts in different positions;

Figure 10 is a vertical sectional view of parts taken on line 10—10 of Figure 4;

Figure 11 is a side view of a portion of a slidable carriage and its supporting stirrup secured on the turntable;

Figure 12 is a vertical sectional view thereof taken on line 12—12 of Figures 2 and 11;

Figure 13 is a side view of a shaft having a worm sleeve rotatable thereon, and a ratchet;

Figure 14 is a sectional view thereof taken on line 14—14 of Figure 13, and showing a worm gear.

Figure 1:
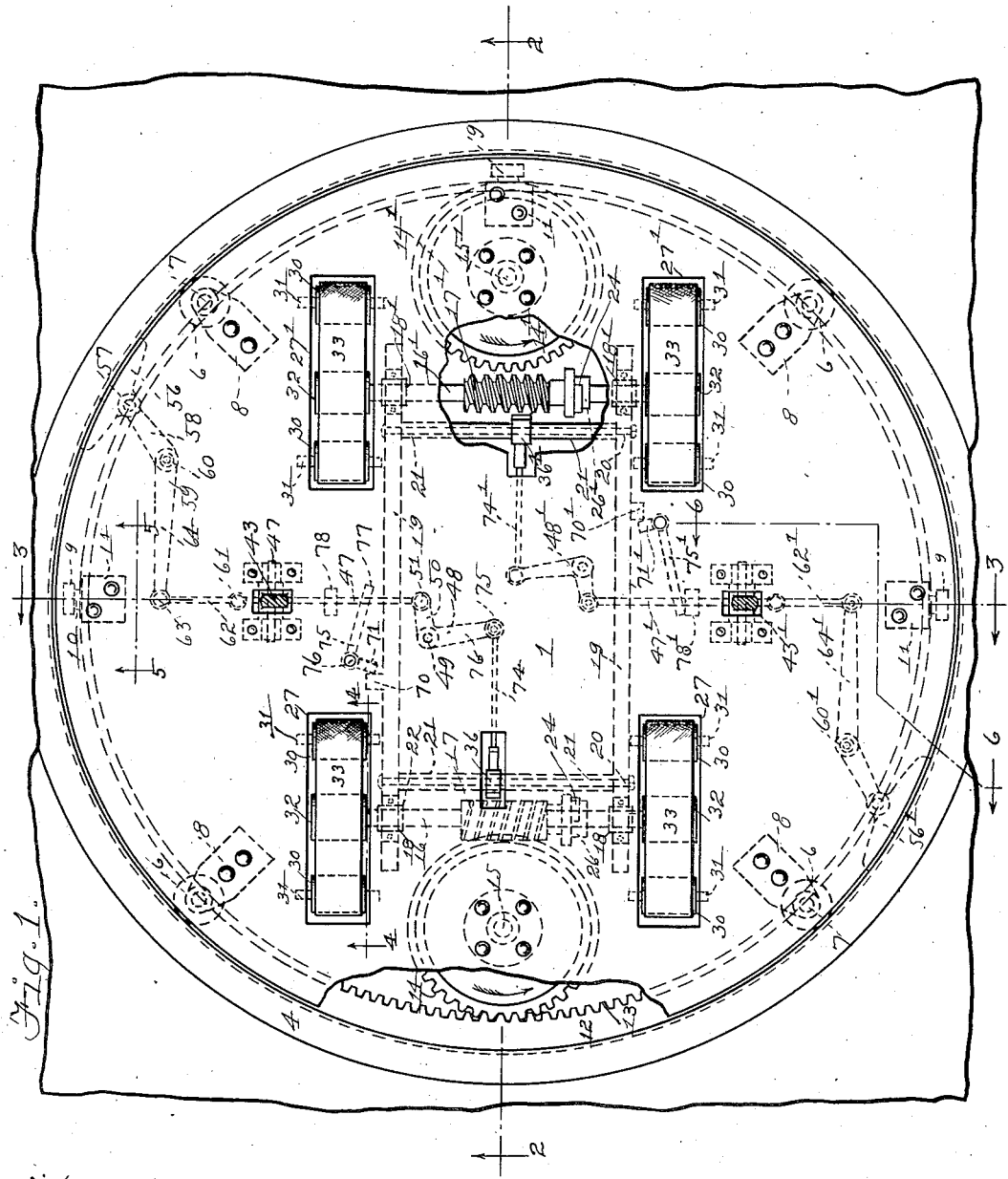
Figure 1 is a plan view of a turntable (portions thereof being broken away to show parts beneath and a pair of hand levers being sectioned on line 1—1 of Figures 2, 3 and 6), the operating parts being shown in this view in their positions after an automobile has been driven onto the turntable from the left hand side thereof and the turntable is about beginning to rotate.

In the embodiment of the invention illustrated by these drawings the turntable 1 is rotatable in the pit 2 of a concrete base 3 having at its edge a circular rim 4 on whose vertical flange 5 bear the wheels 6 journalled at 7 on brackets 8 fastened on the turntable's under side, other wheels 9 being journalled at 10 on brackets 11 mounted on said under side bearing on the circular track 12 to support the turntable. This track member forms a circular rack having teeth 13 on its inner side with which mesh the gears 14, 14$^1$ journalled at 15, 15$^1$ on the under side of the turntable diametrically opposite each other. Parallel shafts 16, 16$^1$ are journalled at 18 on the under side of the parallel side members 19 of a slidable carriage, said side members being connected by bolts 20 extending through spacers 21, the carriage being slidable diametrically of the turntable in bearings or stirrups 22 carried on the turntable's under side. These shafts 16, 16$^1$ have worm sleeves 17, 17$^1$ turnable thereon and provided with dogs 24 spring pressed at 25 into engagement with ratchet wheels 26, 26$^1$ tight on said shafts.

When the carriage is slid to the position indicated in Figure 1, the worm 17 is brought into mesh with the gear 14 to rotate the turntable, but when the carriage is slid to its opposite position the worm 17$^1$ is caused to mesh with gear 14$^1$ for rotating the turntable—all as hereinafter explained.

Two pairs of openings 27 and 27$^1$ extend through the turntable's floor, the openings of each pair being large enough and so properly spaced apart as to receive the lower segmental portions of the propelling wheels 28 of an automobile 29 driven onto the turntable. A pair of cylindrical pulleys 30 are journalled at 31 on the under side of the turntable adjacent the ends of each of said openings, and a similar pulley 32 is carried on each end of each shaft 16, 16$^1$, a strong broad belt 33 passing around the three pulleys and being supported by the pair 30. The automobile may be driven onto the turntable at either side thereof.

Assuming now that the automobile has been (as indicated) driven from the left hand side of Figure 1, the mechanism is operated by the following means and in the following manner. The automobile's propelling rear wheels 28 on reaching the first pair of belts 33 fall into the openings 27 and depress the belts between the pulleys 30 thus greatly tightening the belts thereon and on the other pulleys 31, so that the running motor of the automobile drives these belts by the friction of wheels 28 thereon and thus rotates the shafts 16; and when the automobile has moved far enough forward on the turntable, a downwardly extending rear part thereof (as the differential housing 34 on the rear axle 35) strikes, as shown in Figure 7, the upwardly extending arm 36 of a lever 37 fulcrumed at 38 on the turntable and moves it forward (i. e. toward the right hand side of Figure 7), so that the downwardly extending arm 39 of said lever engaging the shoulder 40 of a bell crank lever 41 fulcrumed on the bolt 20 between the spacers 21 slides the carriage rearwardly (i. e. toward the left hand side of Figures 1 and 7) far enough to carry the worm 17 into mesh with the gear 14 so as to rotate the turntable, the worm's dog 24 engaging the shaft's ratchet wheel 21 for this purpose.

The levers 37, 41 and adjacent parts are now in the position seen in Figure 8 and said worm is held in mesh thereby, the arm 36 operating as a stop to prevent any tendency of the automobile to move forwardly and its wheels 28 to ride up out of their cradling position (seen in Figure 4) between the pulleys 30, during the turntable's rotation. When the turntable has been thus rotated by the running of the automobile's motor to the desired position, the operator releases the automobile's clutch and stops the rotation of the wheels 28. He then pushes the handle arm 42 of a lever 43 fulcrumed at 44 on the turntable, so that said lever's lower arm 45 connected at 46 to the horizontal rod 47 moves said rod toward the bottom of Figure 1, and turns the bell crank lever 48 fulcrumed at 49 (to whose arm 50 said rod is connected at 51) and thus causes the collar 52 of a rod 74 (connected at 75 to arm 76 of said lever) to engage arm 53 of lever 41 and withdraws the shoulder 40 of its other arm 54 from engagement with the lower arm 39 of lever 37 as seen in Figure 9.

This lever 37 being thus released and the worm 17 remaining in mesh with gear 14, the operator now throws the automobile's clutch into engagement and the wheels 28 ride up off of the belts and the automobile moves forward, turning the arm 36 of lever 37 downwardly against its coiled spring 55 and the automobile travels off of the turntable toward the right hand side of Figure 1, whereupon said spring 55 returns lever 37 to initial position shown in Figure 7.

Means for frictionally holding the turntable in turned position are provided, comprising a brake shoe 56 bearing on flange 5 of the rim 4 and pivotally mounted at 57 on arm 58 of a bell crank lever 59 fulcrumed at 60 on the turntable's under side, the rod 47 being pivoted at 61 on a line 62 pivoted at 63 on said lever's arm 64, so that the same movement of said hand lever 42 which causes the brake shoe 56 to engage releases the lever 41 from engagement with the lever 37.

If the automobile be driven onto the turntable from the right hand side of Figure 1, corresponding actions take place by reason of a second set of corresponding parts identified by the same reference numerals with prime marks applied thereto as shown on Figure 1.

In the case (i. e. when the automobile is driven from the right hand side of Figure 1) the sliding of the carriage toward said side to mesh worm 17¹ with gear 14¹ causes the carriage's lug 70 to strike arm 71 of a bell crank lever 75 fulcrumed at 76 on the turntable and thus turns said lever so as to engage its other arm 77 with collar 78 on rod 47 and thus release the brake shoe 56 which was left in engagement with the rim's flange 5 at the end of the machine's previous operation in which the automobile was driven onto the turntable from the left hand side of Figure 1 as hereinbefore described.

The upper arm 36 of lever 37 may be extended to proper position by means of its part 36¹ clamped as by the bolt 73 as indicated in Figures 7, 8 and 9.

The invention being intended to be pointed out in the claims, is not to be limited to or by details of construction and arrangement of any particular embodiment thereof illustrated by the drawings or hereinbefore described.

What is claimed is:

1. In a turntable: a belt mounted thereon for horizontal driven movement, adapted to be engaged and driven by a driven wheel of an automobile on the turntable; means for rotating the turntable; a rotatable element rotatably engaged by the driven belt when tightened by the weight of said wheel in its engagement with the belt; means for operating the turntable-rotating means by the rotation of said element; releasable means for holding the automobile against bodily movement on the turntable comprising a lever fulcrumed on the turntable and having an upwardly extending arm engaged by the automobile to stop its bodily movement.

2. In a turntable: a belt mounted thereon for horizontal driven movement, adapted to be engaged and driven by a driven wheel of an automobile on the turntable; means for rotating the turntable; a rotatable element rotatably engaged by the driven belt and movable into operative engagement with said turntable-rotating means.

3. In a turntable having an opening adapted to receive a segmental portion of the propelling wheel of an automobile on the turntable; a horizontally driven belt carried by pulleys adjacent the ends of said opening, adapted to be engaged by said wheel and driven by the rotation thereof; means for rotating the turntable including a fixed rack concentric therewith and a gear meshing with the rack and journalled on the turntable; a rotatable element rotatably engaged by the driven belt and having a worm; means for moving said element to a position wherein the worm meshes with the gear for rotating the turntable by the driven wheel of the automobile.

4. In a turntable having openings adapted to receive segmental portions of the propelling wheels of an automobile on the turntable; horizontally driven belts carried by pulleys adjacent the ends of said openings, adapted to support said wheels and be driven by the rotation thereof; means for rotating the turntable including a fixed rack concentric therewith and a gear meshing with the rack and journalled on the turntable; a rotatable element comprising a circular portion rotatably engaged by the driven belt and a worm portion; means for moving said element to a position wherein the worm meshes with the gear for rotating the turntable by the driven wheels of the automobile.

5. In a turntable having openings adapted to receive segmental portions of the propelling wheels of an automobile on the turntable; horizontally driven belts carried by pulleys adjacent the ends of said openings, adapted to support said wheels and be driven by the rotation thereof; means for rotating the turntable including a fixed rack concentric therewith and a gear meshing with the rack and journalled on the turntable; a carriage slidably mounted on the turntable's under side; a rotatable element journalled on the carriage comprising a circular portion rotatably engaged by the driven belt and a worm portion; means for sliding the carriage to a position wherein the worm meshes with the gear for rotating the turntable by the driven wheels of the automobile.

6. In a turntable having openings adapted to receive segmental portions of the propelling wheels of an automobile on the turntable; horizontally driven belts carried by pulleys adjacent the ends of said openings, adapted to support said wheels and be driven by the rotation thereof; means for rotating the turntable including a fixed rack concentric therewith and a gear meshing with the rack and journalled on the turntable; a carriage slidably mounted on the turntable's under side; a rotatable element journalled on the carriage comprising a circular portion rotatably engaged by the driven belt and a worm portion; means for sliding the carriage to a position wherein the worm meshes with the gear for rotating the turntable by the driven wheels of the automobile, said means including a lever fulcrumed on the turntable having an arm adapted to be engaged by the automobile in its movement on the turntable and a second arm engaging an abutment on the carriage for sliding the carriage to its said position by the automobile's said movement.

7. In a turntable having openings adapted to receive segmental portions of the propelling wheels of an automobile on the turntable; horizontally driven belts carried by pulleys adjacent the ends of said openings, adapted to support said wheels and be driven by the rotation thereof; means for rotating the turntable including a fixed rack concentric therewith and a gear meshing with the rack and journalled on the turntable; a carriage slidably mounted on the turntable; a rotatable element journalled on the carriage comprising a circular portion rotatably engaged by the driven belt and a worm portion; means for sliding the carriage to a position wherein the worm meshes with the gear for rotating the turntable by the driven wheels of the automobile, said means including a lever fulcrumed on the turntable having an arm adapted to be engaged by the automobile in its movement on the turntable and a second arm, and a lever fulcrumed on the carriage having an arm adapted to be releasably engaged by said second arm for sliding the carriage to its said position by the automobile's said movement.

8. In a turntable having openings adapted to receive segmental portions of the propelling wheels of an automobile on the turntable; horizontally driven belts carried by pulleys adjacent the ends of said openings, adapted to support said wheels and be driven by the rotation thereof; means for rotating the turntable including a fixed rack concentric therewith and a gear meshing with the rack and journalled on the turntable; a carriage slidably mounted on the turntable; a rotatable element journalled on the carriage comprising a circular portion rotatably engaged by the driven belt and a worm portion; means for sliding the carriage to a position wherein the worm meshes with the gear for rotating the turntable by the driven wheels of the automobile, said means including an element movably mounted on the turntable adapted to be engaged by the automobile in its movement on the turntable and moved thereby into engagement with an abutment on the carriage for sliding the carriage to its said position by the automobile's said movement.

9. In a turntable having openings adapted to receive segmental portions of the propelling wheels of an automobile on the turntable; horizontally driven belts carried by pulleys adjacent the ends of said openings, adapted to support said wheels and be driven by the rotation thereof; means for rotating the turntable including a fixed rack concentric therewith and a gear meshing with the rack and journalled on the turntable; a carriage slidably mounted on the turntable; a rotatable element journalled on the carriage comprising a circular portion rotatably engaged by the driven belt and a worm portion; means for sliding the carriage to a position wherein the worm meshes with the gear for rotating the turntable by the driven wheels of the automobile, said means including an element movably mounted on the turntable adapted to be engaged by the automobile in its movement on the turntable and moved thereby into engagement with an abutment on the carriage for sliding the carriage to its said position by the automobile's said movement; manually operated means for releasing the second mentioned element from engagement with said abutment.

10. In a turntable having openings adapted to receive segmental portions of the propelling wheels of an automobile on the turntable; horizontally driven belts carried by pulleys adjacent the ends of said openings, adapted to support said wheels and be driven by the rotation thereof; means for rotating the turntable including a fixed rack concentric therewith and a gear meshing with the rack and journalled on the turntable; a carriage slidably mounted on the turntable; a rotatable element journalled on the carriage comprising a circular portion rotatably engaged by the driven belt and a worm portion; means for sliding the carriage to a position wherein the worm meshes with the gear for rotating the turntable by the driven wheels of the automobile, said means including an element movably mounted on the turntable adapted to be engaged by the automobile in its movement on the turntable and moved thereby into engagement with an abutment on the carriage for sliding the carriage to its said position by the automobile's said movement; means for releasably holding the turntable against rotation; manually operated means for operating the turntable-holding means and for releasing said second-mentioned element from engagement with said abutment.

11. In a turntable having oppositely disposed pairs of openings either pair being adapted to receive segmental portions of the propelling wheels of an automobile on the turntable; pairs of horizontally driven belts carried by pulleys adjacent the ends of the openings respectively, adapted to support said wheels and to be driven by the rotation thereof; means for rotating the turntable including a fixed rack concentric therewith and a pair of gears meshing with the rack and journalled on the turntable; a carriage slidably mounted on the turntable's under side; a pair of rotatable elements journalled on the carriage adjacent its opposite ends, each element comprising circular end portions rotatably engaged by the respective pairs of belts and a middle worm portion; means for sliding the carriage to one position wherein one worm meshes with one gear and to an opposite position wherein the other worm meshes with the other gear for rotating the turntable by the driven wheels of the automobile.

12. In a turntable having oppositely disposed pairs of openings either pair being adapted to receive segmental portions of the propelling wheels of an automobile on the turntable; pairs of horizontally driven belts carried by pulleys adjacent the ends of the openings respectively, adapted to support said wheels and to be driven by the rotation thereof; means for rotating the turntable including a fixed rack concentric therewith and a pair of gears meshing with the rack and journalled on the turntable; a carriage slidably mounted on the turntable's under side; a pair of rotatable elements journalled on the carriage adjacent its opposite ends, each element comprising circular end portions rotatably engaged by the respective pairs of belts and a middle worm portion; means for sliding the carriage to one position wherein one worm meshes with one gear and to an opposite position wherein the other worm meshes with the other gear for rotating the turntable by the driven wheels of the automobile, said means including a second pair of elements movably mounted on the turntable adjacent its opposite sides respectively, adapted to be engaged by the automobile in its opposite movements respectively on the turntable and moved thereby into engagement with respective abutments on the carriage for sliding the carriage to its said positions by the automobile's said movements respectively.

13. In a turntable having oppositely disposed pairs of openings either pair being adapted to receive segmental portions of the propelling wheels of an automobile on the turntable; pairs of horizontally driven belts carried by pulleys adjacent the ends of the openings respectively, adapted to support said wheels and to be driven by the rotation thereof; means for rotating the turntable including a fixed rack concentric therewith and a pair of gears meshing with the rack and journalled on the turntable; a carriage slidably mounted on the turntable's under side; a pair of rotatable elements journalled on the carriage adjacent its opposite ends, each element comprising circular end portions rotatably engaged by the respective pairs of belts and a middle worm portion; means for sliding the carriage to one position wherein one worm meshes with one gear and to an opposite position wherein the other worm meshes with the other gear for rotating the turntable by the driven wheels of the automobile, said means including a second pair of elements movably mounted on the turntable adjacent its opposite sides respectively, adapted to be engaged by the automobile in its opposite movements respectively on the turntable and moved thereby into engagement with respective abutments on the carriage for sliding the carriage to its said positions by the automobile's said movements respectively; a pair of separately acting means for releasably holding the turntable against rotation; a pair of manually operated means for severally operating the turntable-holding means and for releasing said last mentioned elements from engagement with said abutments respectively.

14. In a turntable having oppositely disposed pairs of openings either pair being adapted to receive segmental portions of the propelling wheels of an automobile on the turntable; pairs of horizontally driven belts carried by pulleys adjacent the ends of the openings respectively, adapted to support said wheels and to be driven by the rotation thereof; means for rotating the turntable including a fixed rack concentric therewith and a pair of gears meshing with the rack and journalled on the turntable; a carriage slidably mounted on the turntable's under side; a pair of rotatable elements journalled on the carriage adjacent its opposite ends, each element comprising circular end portions rotatably engaged by the respective pairs of belts and a middle worm portion; means for sliding the carriage to one position wherein one worm meshes with one gear and to an opposite position wherein the other worm meshes with the other gear for rotating the turntable by the driven wheels of the automobile, said means including a second pair of elements movably mounted on the turntable adjacent its opposite sides respectively, adapted to be engaged by the automobile in its opposite movements respectively on the turntable and moved thereby into engagement with respective abutments on the carriage for sliding the carriage to its said positions by the automobile's said movements respectively; a pair of separately acting means for releasably holding the turntable against rotation; a pair of manually operated means for severally operating the turntable-holding means and for releasing said last mentioned elements from engagement with said abutments respectively; means for releasing the turntable-holding means by the sliding movement of the carriage to either of its said opposite positions.

JOHN VAN NIEUWLAND.